(No Model.)
J. K. MILLER.
ROPE HOOK.
No. 447,618.  Patented Mar. 3, 1891.
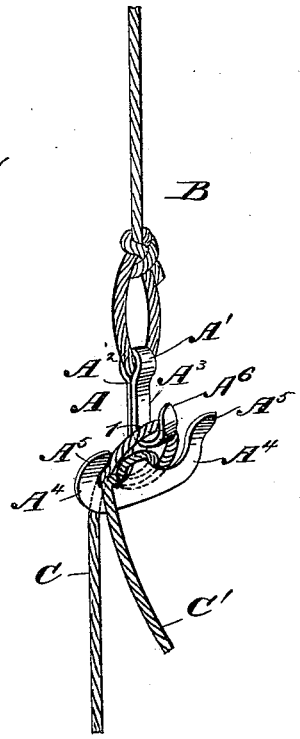
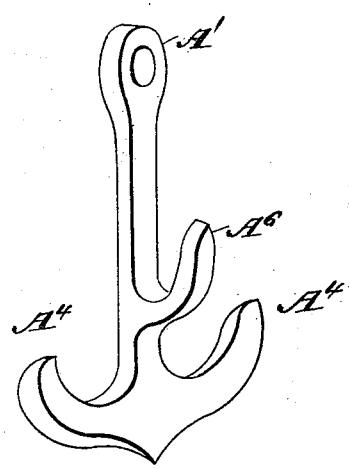
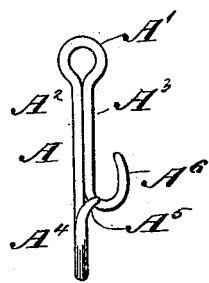
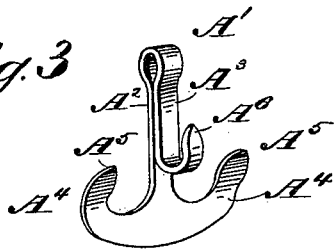
WITNESSES:
F. McArdle.
C. Sedgwick.
INVENTOR:
J. K. Miller
BY Munn & Co.
ATTORNEYS

UNITED STATES PATENT OFFICE.

JAMES K. MILLER, OF EMPORIA, KANSAS.

ROPE-HOOK.

SPECIFICATION forming part of Letters Patent No. 447,618, dated March 3, 1891.

Application filed May 17, 1890. Serial No. 352,246. (No model.)

*To all whom it may concern:*

Be it known that I, JAMES K. MILLER, of Emporia, in the county of Lyon and State of Kansas, have invented a new and Improved Rope-Hook, of which the following is a full, clear, and exact description.

My invention relates to improvements in rope-hooks; and the object of the invention is to provide a hook that is suitable for use with clothes-lines, hammocks, for hoisting purposes, or for fastening bundles, and various other purposes, and one by which a rope may be easily and quickly fastened.

To this end my invention consists in a hook having a single shank and a terminal eye, and having two oppositely-extending hooks at its lower end, and a central hook above said lower hooks and at right angles to the same.

Reference is to be had to the accompanying drawings, forming a part of this specification, in which similar letters of reference indicate corresponding parts in all the views.

Figure 1 is a perspective view of the device suspended by a rope and having another rope fastened therein. Fig. 2 is a side elevation of the hook with the ropes detached. Fig. 3 is a perspective view of the same, and Fig. 4 is a perspective view of a modified form of hook.

The hook A is provided with the shank formed of the members $A^2$ and $A^3$, which are doubled together in such a manner as to form an eye $A'$ at one end of the shank. The member $A^2$ extends below the member $A^3$ and is formed into two oppositely-extending hooks $A^4$, which terminate in oppositely-curved points $A^5$. The member $A^3$ is formed into a terminal hook $A^6$, which will thus project from the shank at right angles to the hooks $A^4$, and will be a little above the said hooks.

As shown, the shank of the hook is composed of the members $A^2$ and $A^3$; but it is evident that the shank might be formed of a single piece, with the hooks $A^4$ and $A^6$ welded or cast thereon, as shown in Fig. 4.

As used for hoisting purposes, the hook is suspended by a suitable rope B, which is attached to the eye $A'$ of the hook, and the rope C, to which a weight may be attached, is suitably secured in the hook. As shown in Fig. 1, it is to be done by passing the rope up behind the hooks $A^4$, as shown at $l$, thence through the upper hook $A^6$, and one or more turns around the shank between hook $A^6$ and the lower hooks $A^4$, the free end $C'$ of the rope C being allowed to dangle from the hook, as shown.

While I have shown a particular means for fastening the rope C in the hook, it is evident that it may be fastened in a great many ways, so as either to hold the rope in a stationary position or to allow it to slide slowly through the hook.

It will be seen that by having the two hooks $A^4$ upon opposite sides of the shank the rope C may be passed through either of said hooks, and may be passed through the central hook $A^6$ from either the right hand or the left with equal facility, so that an unskilled person will have no difficulty in securing the rope to the hook.

When used as a hoisting-rope, the hook should be made sufficiently strong for the purpose; but it is obvious that the hook may be stamped from sheet metal, and may be used as a twine-hook for fastening various kinds of bundles, bags, &c.

Having thus described my invention, I claim as new and desire to secure by Letters Patent—

1. A rope-hook consisting of a shank having an eye at its upper end and provided at its lower end with two hooks projecting in diametrically-opposite directions, and with a third hook projecting from the shank above and at right angles to the two hooks, substantially as described.

2. A rope-hook consisting of a shank having an eye at its upper end and provided at its lower end with two hooks projecting in diametrically-opposite directions and having oppositely-curved points, and with a third hook above and at right angles to the two hooks, substantially as herein shown and described.

3. A rope-hook consisting of a shank formed of two members of unequal length doubled together to form an eye, the lower end of the shorter member being formed into a hook and the lower end of the longer member into two oppositely-projecting hooks, substantially as described.

JAMES K. MILLER.

Witnessse:
T. J. TURNER,
A. WEHRMAN.